(12) United States Patent
Nakata et al.

(10) Patent No.: US 9,068,679 B2
(45) Date of Patent: Jun. 30, 2015

(54) FLUID COUPLING AND RETAINER FOR FLUID COUPLING

(75) Inventors: Tomohiro Nakata, Osaka (JP); Akihiro Harada, Osaka (JP); Michio Yamaji, Osaka (JP)

(73) Assignee: FUJIKIN INCORPORATED, Osaka-shi (JP)

( * ) Notice: Subject to any disclaimer, the term of this patent is extended or adjusted under 35 U.S.C. 154(b) by 322 days.

(21) Appl. No.: 12/736,492

(22) PCT Filed: Apr. 21, 2009

(86) PCT No.: PCT/JP2009/057884
§ 371 (c)(1),
(2), (4) Date: Oct. 13, 2010

(87) PCT Pub. No.: WO2009/131105
PCT Pub. Date: Oct. 29, 2009

(65) Prior Publication Data
US 2011/0031745 A1 Feb. 10, 2011

(30) Foreign Application Priority Data

Apr. 22, 2008 (JP) ................................. 2008-110956

(51) Int. Cl.
*F16L 23/02* (2006.01)
*F16L 23/028* (2006.01)
(Continued)

(52) U.S. Cl.
CPC ......... *F16L 23/0283* (2013.01); *F16L 19/0286* (2013.01); *F16L 23/20* (2013.01)

(58) Field of Classification Search
CPC .............. F16L 19/0212; F16L 19/0218; F16L 19/0286; F16L 19/025; F16L 19/04; F16L 19/041; F16L 19/043; F16L 23/20; F16L 23/028; F16L 23/0283

USPC ......... 285/353, 354, 364, 385, 389, 336, 349, 285/379, 380
See application file for complete search history.

(56) References Cited

U.S. PATENT DOCUMENTS 2,999,701 A * 9/1961 Blair et al. ..................... 285/340
4,552,389 A * 11/1985 Babuder et al. ............... 285/379
(Continued)

FOREIGN PATENT DOCUMENTS

| JP | 4-121592 | 10/1992 |
| JP | 10-122452 A | 5/1998 |

(Continued)

OTHER PUBLICATIONS

International Search Report for PCT/JP2009/057884 issued Jul. 14, 2009.

*Primary Examiner* — Daniel P Stodola
*Assistant Examiner* — James Linford
(74) *Attorney, Agent, or Firm* — Locke Lord LLP

(57) ABSTRACT

Providing a fluid coupling, in which a coupling member is readily retained by a retainer and the retainer can be readily attached to or detached from the coupling member, and a retainer for such a fluid coupling. A retainer includes an annular gasket retaining portion for retaining a gasket therein and an annular coupling member retaining portion which has an inner diameter greater than that of the gasket retaining portion and retains one coupling member. At an inner circumference of the gasket retaining portion and an inner circumference of the coupling member retaining portion are formed annular grooves respectively, for holding therein elastic rings respectively.

2 Claims, 3 Drawing Sheets

(51) Int. Cl.
*F16L 19/028* (2006.01)
*F16L 23/20* (2006.01)

(56) References Cited

U.S. PATENT DOCUMENTS

| | | | |
|---|---|---|---|
| 5,145,219 A * | 9/1992 | Babuder | 285/330 |
| 5,340,170 A * | 8/1994 | Shinohara et al. | 285/379 |
| 5,355,908 A * | 10/1994 | Berger et al. | 137/614.04 |
| 5,366,261 A * | 11/1994 | Ohmi et al. | 285/328 |
| 5,472,216 A * | 12/1995 | Albertson et al. | 277/530 |
| 5,673,946 A * | 10/1997 | Barber et al. | 285/328 |
| 5,681,064 A * | 10/1997 | Aldridge et al. | 285/379 |
| 5,979,910 A * | 11/1999 | Shinohara et al. | 277/616 |
| 6,170,890 B1 * | 1/2001 | Ohmi et al. | 285/379 |
| 6,233,128 B1 * | 5/2001 | Spencer et al. | 361/86 |
| 6,623,047 B2 * | 9/2003 | Olechnowicz et al. | 285/328 |
| 7,040,667 B2 * | 5/2006 | Nieslony | 285/276 |
| 7,140,647 B2 * | 11/2006 | Ohmi et al. | 285/328 |
| 2001/0038206 A1 | 11/2001 | Olechnowicz et al. | |
| 2005/0225084 A1 | 10/2005 | Ohmi et al. | |
| 2008/0191426 A1 * | 8/2008 | Doyle | 277/616 |

FOREIGN PATENT DOCUMENTS

| | | |
|---|---|---|
| JP | 2002-504213 T | 2/2002 |
| JP | 2002-115760 A | 4/2002 |
| TW | 053516 | 10/1983 |
| TW | 382427 U | 2/2000 |
| TW | 488459 U | 5/2002 |
| TW | M306554 U | 2/2007 |
| TW | M327248 U | 2/2008 |

* cited by examiner

FLUID COUPLING AND RETAINER FOR FLUID COUPLING

TECHNICAL FIELD

The present invention relates to a fluid coupling which achieves sealability owing to plastic deformation of a metallic gasket, and a retainer for a fluid coupling for retaining a gasket in the fluid coupling.

BACKGROUND ART

There has been well known a fluid coupling which includes first and second coupling members having fluid passages communicating with each other and an annular gasket interposed between abutment ends of the coupling members and achieves sealability owing to plastic deformation of the gasket. Normally, a retainer for retaining the gasket in the coupling members is used in such a fluid coupling.

Patent Literature 1 discloses a retainer for such a fluid coupling, which includes a gasket retaining portion for retaining the outer peripheral surface of an annular gasket and a coupling member retaining portion for retaining the end of the coupling member, the coupling member retaining portion having a plurality of elastically deformable coupling member retaining claws projecting in an axial direction, wherein a plurality of gripping claws are elastically deformed inward in a radial direction so as to elastically deform each of the coupling member retaining claws outward in the radial direction.

Patent Literature 1: Japanese Unexamined Patent Application Publication No. 10-122452

DISCLOSURE OF THE INVENTION

Problems to be Solved by the Invention

The above-described retainer for the fluid coupling has the advantages of being capable of satisfactorily retaining the coupling member, and further, of readily being attached to and detached from the coupling member. However, as the diameter of the retainer becomes larger, it becomes more difficult to elastically deform the coupling member retaining claws outward in the radial direction. In other words, there arises a problem that the above-described retainer for the fluid coupling is hardly applied to a coupling member having a large diameter.

An object of the present invention is to provide a fluid coupling in which, even if it has a large diameter, a coupling member can be readily retained by a retainer and the retainer can be readily attached to or detached from the coupling member, and a retainer for such a fluid coupling.

Means for Solving the Problems

A fluid coupling according to the present invention includes: first and second coupling members having fluid passages communicating with each other; an annular gasket interposed between abutment ends of the coupling members; a retainer which retains the gasket; and screw means for joining the coupling members to each other, wherein the retainer includes an annular gasket retaining portion for retaining the gasket and an annular coupling member retaining portion for retaining either one of the coupling members, the gasket retaining portion of the retainer being joined to the gasket via a ring, and further, the coupling member retaining portion of the retainer being joined to the coupling member via an elastic ring.

A retainer for a fluid coupling according to the present invention for retaining an annular gasket interposed between abutment ends of first and second coupling members having fluid passages communicating with each other, includes: an annular gasket retaining portion for retaining the gasket; and an annular coupling member retaining portion which has an inner diameter greater than that of the gasket retaining portion and retains either one of the coupling members, wherein an annular groove is formed at an inner circumference of the coupling member retaining portion, an elastic ring is held in the groove, and the gasket is retained in the gasket retaining portion via a ring.

The retainer is, for example, an integrated part consisting of a small-diameter portion and a large-diameter portion having a greater inner diameter than that of the small-diameter portion and being formed into an inverse L shape in cross section, the small-diameter portion serving as the gasket retaining portion whereas the large-diameter portion serving as the coupling member retaining portion.

In the above description, the "elastic ring" signifies an elastically deformable ring in a radial direction. Moreover, the "ring" is not limited to the elastically deformable ring in the radial direction, and further, includes the "elastic ring," a "rigid ring," and the like.

A circular snap ring formed into a C shape obtained by cutting a part of a circular ring may be used as the elastic ring. The elastic ring is not limited to such a snap ring but may be selected from various ring-like members having elasticity such as an O-ring.

The rigid ring is exemplified by a metallic ring, for example, a washer, but it is not limited to this. Here, the term "rigid" of the rigid ring signifies that, in contrast with the elastic ring whose diameter can be readily varied by hand, it is not inelastic but its diameter cannot be manually varied.

The annular grooves for holding the elastic ring may be formed in the coupling member and the gasket, and preferably, they should be formed at an inner circumference of the gasket retaining portion and the inner circumference of the coupling member retaining portion in the retainer. In this case, in order to more firmly join the retainer and the gasket to each other, a V-shaped, annular shallow groove, for example, may be formed at an outer periphery of the gasket.

In the fluid coupling and the retainer for the fluid coupling according to the present invention, the coupling member retaining portion of the retainer and the coupling member may be joined via the elastic ring, and further, the gasket retaining portion of the retainer and the gasket may be joined via the elastic ring (the first preferred embodiment) or the rigid ring (the second preferred embodiment).

In the first preferred embodiment in which the gasket retaining portion of the retainer and the gasket are joined via the elastic ring, each of the elastic rings is the snap ring obtained by forming a circular metallic wire rod into a C shape, and the annular grooves are formed at the inner circumference of the gasket retaining portion and the inner circumference of the coupling member retaining portion, respectively, so that the elastic rings are held in the grooves, respectively.

An inner diameter of the first elastic ring fitted into the annular groove of the gasket retaining portion is smaller than an outer diameter of the gasket in a free state. A diameter at a bottom surface of the annular groove is greater than an outer diameter of the first elastic ring in the free state. It is preferable that the gasket should be retained in the gasket retaining portion because the fixture of the elastic ring at the outer periphery of the gasket can prevent the elastic ring from falling from the annular groove by elastic force of the first elastic ring which will contract in the radial direction. In contrast, an inner diameter of the second elastic ring fitted into the annular groove formed at the coupling member retaining portion is smaller than an outer diameter of the coupling member in a free state. A diameter at a bottom surface of the annular groove is greater than an outer diameter of the second elastic ring in the free state. It is preferable that the coupling member retaining portion should be retained in the coupling member because the fixture of the elastic ring at the outer periphery of the coupling member can prevent the elastic ring from falling from the annular groove by an elastic force of the second elastic ring which will contract in the radial direction.

In the first preferred embodiment, the elastic forces of the first elastic ring and the second elastic ring are appropriately adjusted, preferably, such that the elastic force (i.e., the joining force) of the first elastic ring for joining the gasket retaining portion of the retainer to the gasket is made greater than that of the second elastic ring for joining the coupling member retaining portion of the retainer to the coupling member. In this manner, the gasket hardly falls from the gasket retaining portion of the retainer, and therefore, the retainer retaining the gasket therein can be easily handled.

In the second preferred embodiment in which the gasket retaining portion of the retainer is joined to the gasket via the rigid ring, the gasket includes a large-diameter portion having a positioning portion projecting outward in a radial direction and a small-diameter portion having a same inner diameter as that of the large-diameter portion whereas a smaller outer diameter. The gasket retaining portion preferably should include a fitted portion to be fitted to a positioning portion of the gasket and a positioning portion abutting against the positioning portion of the gasket outside in an axial direction. In this manner, the fitting between the positioning portions can securely prevent the gasket from being moved in the axial direction with respect to the retainer when the retainer is held in the coupling member.

In the second preferred embodiment, the elastic ring for joining the coupling member retaining portion of the retainer to the coupling member may be a snap ring obtained by forming a circular metallic wire rod into a C shape. An inner diameter of the elastic ring is smaller than an outer diameter of the coupling member in the free state. A diameter at the bottom surface of the annular groove is greater than an outer diameter of the elastic ring in the free state. It is preferable that the coupling member retaining portion should be held in the coupling member because the fixture of the elastic ring at the outer periphery of the coupling member can prevent the elastic ring from falling from the annular groove by the elastic force of the elastic ring which will contract in the radial direction.

Moreover, in the second preferred embodiment, it is preferable that the rigid ring for joining the gasket retaining portion of the retainer to the gasket should be metallic, should have a same inner diameter as the outer diameter of the large-diameter portion of the gasket and a same outer diameter as the inner diameter of the coupling member retaining portion of the retainer, and should be press-fitted to the large-diameter portion of the gasket and the coupling member retaining portion of the retainer, to thus abut against the positioning portion of the gasket and the fitted portion of the retainer.

The rigid ring is press-fitted into the gasket retaining portion of the retainer and the gasket, respectively, so that the gasket retaining portion of the retainer and the gasket are joined to each other via the rigid ring. The fitting may be close fit or middle fit. Alternatively, the fitting therebetween may be free fit, and further, a small stopper step (i.e., a projection) may be formed at the gasket retaining portion of the retainer. In this case, it is preferable that the gasket should have a positioning portion for positioning the fitted rigid ring.

In assembling a fluid coupling, the gasket has been previously retained in the retainer. When the gasket retaining retainer is held in either one of the coupling members, the gasket can be disposed and positioned.

The coupling member normally includes an annular gasket pressing projection which is formed into, for example, an arcuate shape in cross section and deforms the gasket in first abutment against the gasket when screw means is tightened. Accordingly, the gasket has a circular passage at the center of, for example, a disk (i.e., both surfaces of the gasket being flat surfaces perpendicular to the axial direction), but it is not limited to this. For example, an annular recess corresponding to the annular projection in the coupling member may be formed at the gasket. Alternatively, an annular projection may be formed at the gasket, and then, abutment ends of the coupling member may be made flat.

The configuration of the screw means may be variously designed. For example, a male screw may be formed at either one of the first and second coupling members, and then, the coupling members may be joined to each other by a cap nut screwed in the male screw in the coupling member. Or, both of the first and second coupling members may be sleeves without any male screw, and then, both of the coupling members may be joined to each other by a male screw member and a cap nut which are independent. Alternatively, both of the coupling members, one of which has a bolt insertion hole whereas the other of which has a female screw, may be joined to each other via a bolt.

Effect of the Invention

With the fluid coupling and the retainer for the fluid coupling according to the present invention, the coupling members are held via the elastic ring held in the coupling member retaining portion of the retainer, and further, the gasket is retained in the gasket retaining portion of the retainer via a ring. Therefore, the gasket can be securely retained in the retainer, and further, it is possible to readily retain the coupling members by the retainer with the gasket and attach or detach the retainer with the gasket to or from the coupling members.

BRIEF DESCRIPTION OF THE DRAWINGS

FIG. 1 is a vertically cross-sectional view showing a fluid coupling in a first preferred embodiment according to the present invention.
FIG. 2 is an exploded perspective view showing a retainer for the fluid coupling in the first preferred embodiment according to the present invention.
FIG. 3 is a vertically cross-sectional view showing, in enlargement, a fluid coupling and a retainer for the fluid coupling in a second preferred embodiment according to the present invention.

Figure 1:
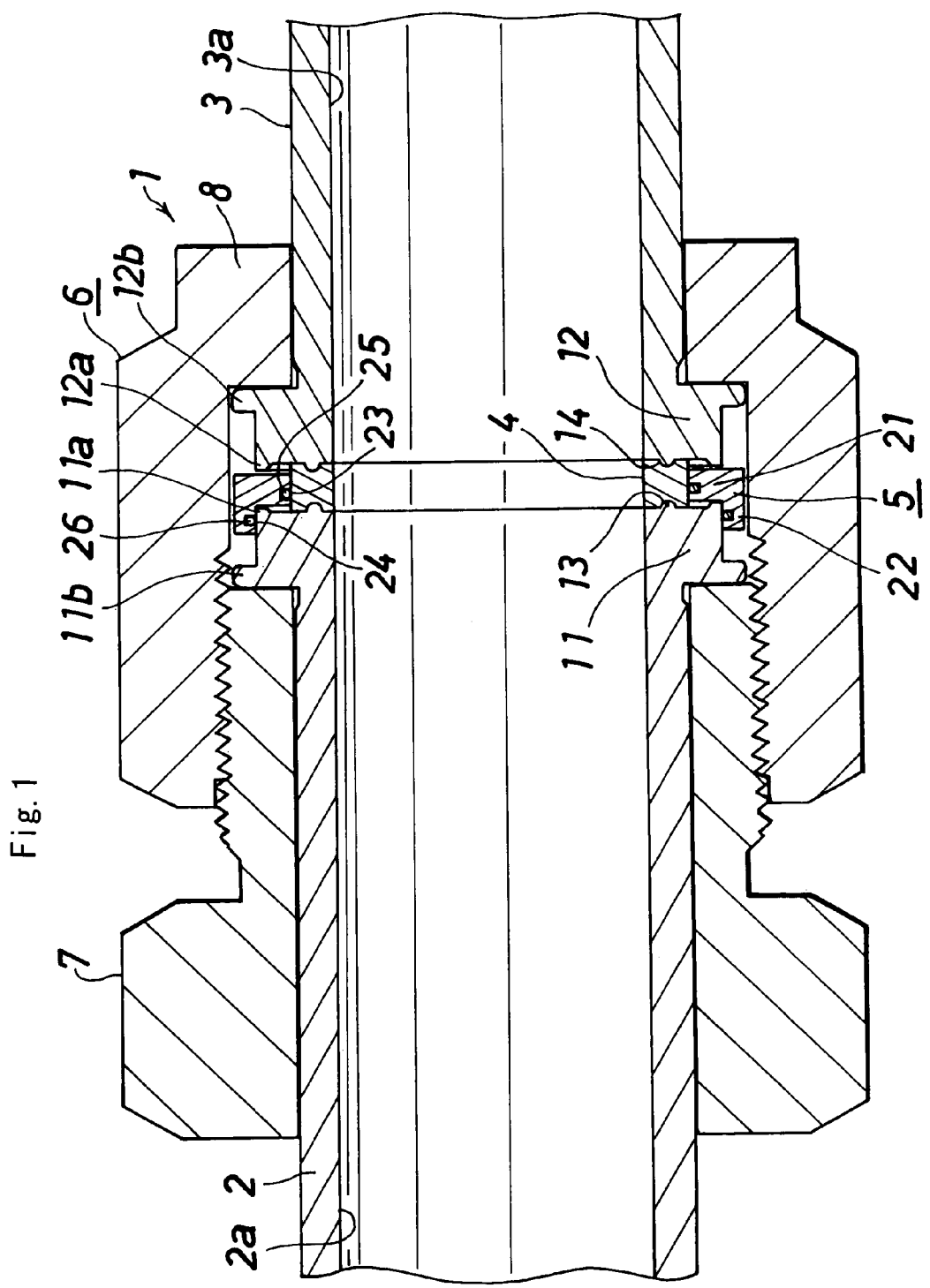
[FIG. 1]

DESCRIPTION OF REFERENCE NUMERALS (1) fluid coupling
(2) first coupling member (3) second coupling member
(2a) (3a) fluid passage
(4) gasket
(5) retainer
(6) screw means
(21) gasket retaining portion
(22) coupling member retaining portion
(23) (24) annular groove
(25) first elastic ring
(26) second elastic ring
(34) gasket
(35) retainer
(51) gasket retaining portion
(52) coupling member retaining portion
(55) annular groove
(56) elastic ring
(57) metallic washer (rigid ring)

Best Mode For Carrying Out The Invention

Preferred embodiments according to the present invention will be explained with reference to the drawings. In the explanation below, the right and the left are indicated with reference to FIG. 1.

As shown in FIG. 1, a fluid coupling (1) according to the present invention comprises first and second coupling members (2) and (3) having fluid passages (2a) and (3a) communicating with each other; an annular gasket (4) interposed between abutment ends of the coupling members (2) and (3); a retainer (5) which retains the gasket (4) and is held in the first coupling member (2); and screw means (6) for joining the coupling members (2) and (3) to each other.

The first coupling member (2) arranged on the left and the second coupling member (3) arranged on the right are sleeves having a same shape, and include flanges (11) and (12) around the abutment ends thereof, respectively.

The gasket (4) is made of a nickel alloy or the like. The gasket (4) is plastically deformed between the abutment ends of the coupling members (2) and (3), thereby providing sealability. Annular gasket pressing projections (13) and (14) are formed at the abutment ends of the coupling members (2) and (3). FIG. 1 shows an adequately tightened state. Here, the gasket pressing projections (13) and (14) bite both surfaces of the gasket (4), thereby securing a strong sealability. In addition, portions of the coupling members (2) and (3) without the gasket pressing projections (13) and (14) are entirely brought into close contact with both surfaces of the gasket (4), thereby further enhancing the sealability.

The gasket (4) is retained by the retainer (5), and further, the gasket (4) is positioned by the retainer (5) being held in the first coupling member (2). An inner diameter of the gasket (4) is equal to that of each of the coupling members (2) and (3).

The respective flanges (11) and (12) of the coupling members (2) and (3) are greater in outer diameter than an outer diameter of the gasket (4). Protrusions (11a) and (12a) are formed at the respective abutment surfaces of the flanges (11) and (12) inward in an axial direction and oppositely to each other with slight spaces from the retainer (5). Additionally, ledges (11b) and (12b) projecting radially outward and being substantially equal in outer diameter to the retainer (5) are formed at ends inward in the axial direction of the flanges (11) and (12), respectively.

The screw means (6) includes: a male screw member (7) which is fitted to the first coupling member (2) and abuts leftward against a left surface of the flange (11) of the first coupling member (2); and a cap nut (8) which is fitted to the second coupling member (3) and is screwed rightward to the male screw member (7) and whose top wall abuts rightward against a right surface of the flange (12) of the second coupling member (3).

Figure 2:
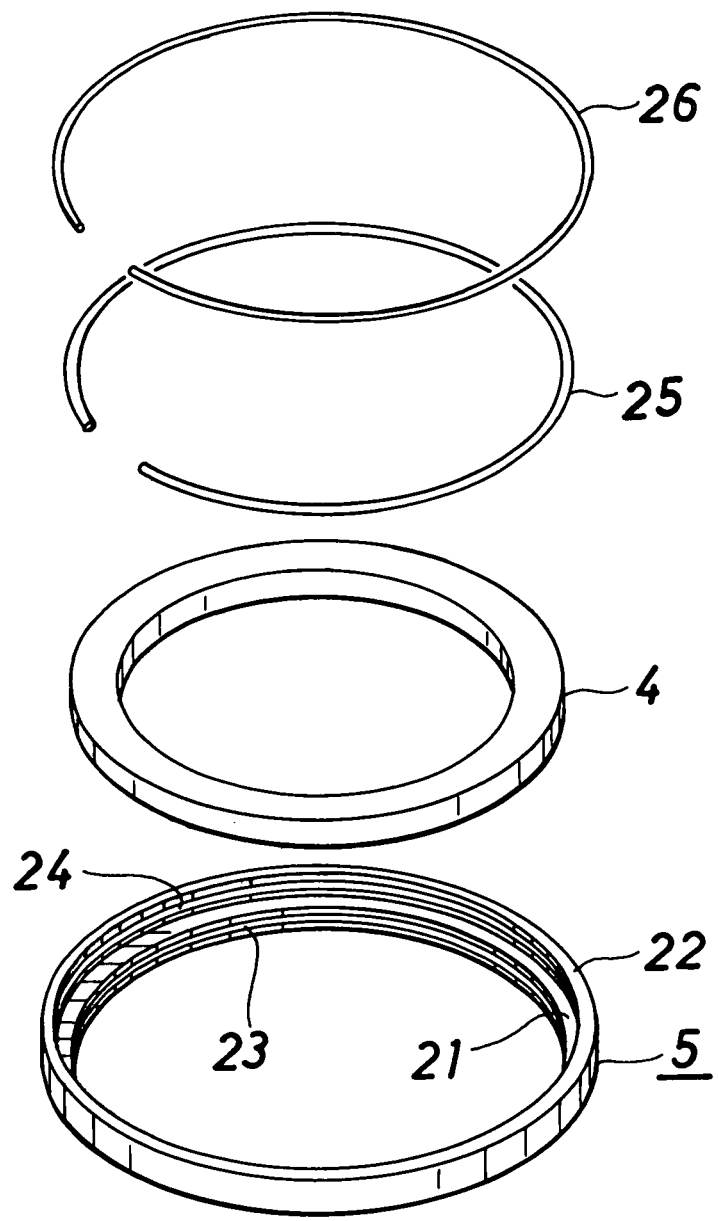
[FIG. 2]

As shown in FIGS. 1 and 2, the retainer (5) includes an annular gasket retaining portion (21) for retaining the gasket (4) and a coupling member retaining portion (22) for retaining the first coupling member (2).

An inner diameter of the gasket retaining portion (21) is substantially equal to the outer diameter of the gasket (4). In the meantime, an inner diameter of the coupling member retaining portion (22) is substantially equal to an outer diameter of the right end of the flange (11) of the first coupling member (2).

Annular grooves (23) and (24) are formed at an inner circumference of the gasket retaining portion (21) and an inner circumference of the coupling member retaining portion (22), respectively. Inside of the grooves (23) and (24) are contained first and second elastic rings (25) and (26), respectively. The first and second elastic rings (25) and (26) are referred to as snap rings which are obtained by forming circular (circular in cross section) metallic wire rods into a C shape, thereby providing elasticity in the radial direction.

An inner diameter of the first elastic ring (25) fitted into the annular groove (23) of the gasket retaining portion (21) is smaller than the outer diameter of the gasket (4) in a free state. The gasket (4) is retained in the gasket retaining portion (21) by an elastic force of the first elastic ring (25) which will contract in the radial direction. The diameter at a bottom surface of the annular groove (23) is greater than an outer diameter of the first elastic ring (25) in the free state, and therefore, the movement of the first elastic ring (25) outward in the radial direction cannot be suppressed. As a consequence, the gasket (4) and the retainer (5) can be retained in an integrated state unless any force is exerted from the outside. Thus, it is possible to readily attach or detach the gasket (4) to or from the retainer (5) simply by moving the gasket (4) with respect to the retainer (5) in an axial direction against frictional force (i.e., joining force) associated with the elastic force of the first elastic ring (25).

An inner diameter of the second elastic ring (26) fitted into the annular groove (24) of the coupling member retaining portion (22) is smaller than the outer diameter of the flange (11) of the first coupling member (2) in a free state. The coupling member retaining portion (22) is retained in the flange (11) of the first coupling member (2) by an elastic force of the second elastic ring (26) which will contract in the radial direction. The diameter at a bottom surface of the annular groove (24) is greater than the outer diameter of the second elastic ring (26) in the free state, and therefore, the movement of the second elastic ring (26) outward in the radial direction cannot be suppressed. Thus, it is possible to readily attach or detach the retainer (5) to or from the first coupling member (2) simply by moving the retainer (5) with respect to the first coupling member (2) in the axial direction against frictional force (i.e., joining force) associated with the elastic force of the second elastic ring (26). In assembling a fluid coupling, after the retainer (5) retaining the gasket (4) therein is disposed in the first coupling member (2), the subsequent work (the second coupling member (3) abuts against the gasket (4), and then, the male screw member (7) and the cap nut (8) are screwed with each other) can be performed without any fear of falling-down of the retainer (5) retaining the gasket (4) therein.

During assembling the fluid coupling, the gasket (4) is prepared in the state in which it is retained in the retainer (5), and then, the retainer (5) is held in the first coupling member (2), thereby properly disposing and positioning the gasket (4).

In disassembling the fluid coupling, when the retainer (5) is detached from the first coupling member (2), the gasket (4) is detached in the state in which it is retained in the retainer (5). If replacement is needed, the old gasket (4) is detached from the retainer (5), and then, it is replaced with a new one.

In the above description, the elastic forces of the first elastic ring (25) and the second elastic ring (26) are appropriately adjusted such that the retainer (5) and the gasket (4) are joined in a manner as to be readily attached to or detached from each other via the first elastic ring (25) whereas the retainer (5) and the first coupling member (2) are joined in a manner as to be readily attached to or detached from each other via the second elastic ring (26). Preferably, the elastic force (i.e., the joining force) of the first elastic ring (25) should be greater than that of the second elastic ring (26). In this manner, the gasket (4) joined via the first elastic ring (25) hardly falls from the retainer (5), and therefore, the retainer (5) retaining the gasket (4) therein can be easily handled.

Figure 3:
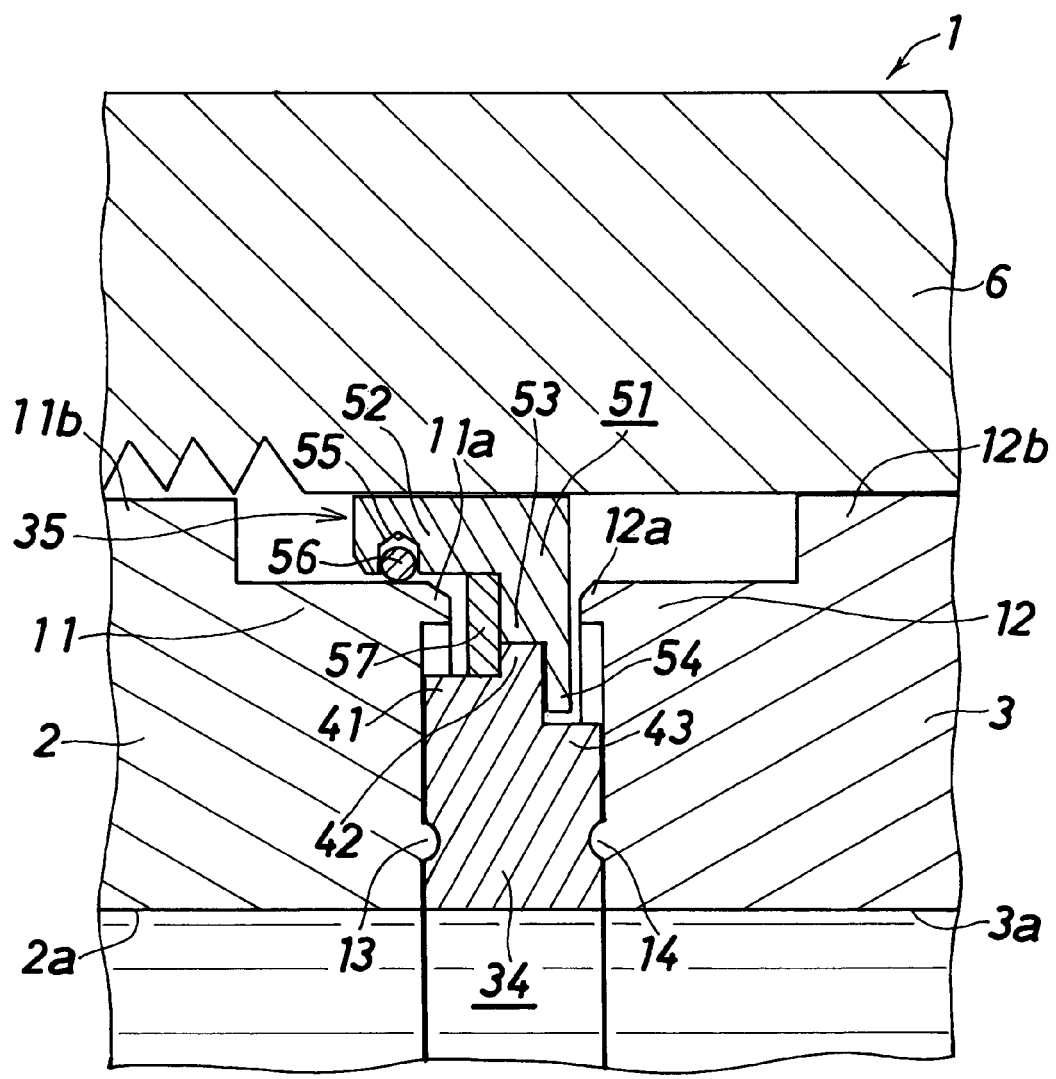
[FIG. 3]

In order to prevent the gasket (4) from falling from the retainer (5), the first elastic ring (25) may be replaced with a metallic rigid ring. This preferred embodiment is shown in FIG. 3. First and second coupling members (2) and (3) and screw means (6) in the second preferred embodiment have the same configurations as those in the first preferred embodiment. However, a gasket (34) and a retainer (35) are different from those in the first preferred embodiment. Hereinafter, the same configurations as those in the first preferred embodiment are designated by the same reference numerals, and their explanations are omitted. A description will be given below of only the gasket (34) and the retainer (35).

The gasket (34) includes a large-diameter portion (41) having a positioning portion (42) projecting outward in a radial direction and a small-diameter portion (43) having the same inner diameter as that of the large-diameter portion (41) whereas a smaller outer diameter. The positioning portion (42) is formed on the boundary between the large-diameter portion (41) and the small-diameter portion (43).

The retainer (35) includes an annular gasket retaining portion (51) for retaining the gasket (34) therein and a coupling member retaining portion (52) for retaining the first coupling member (2) therein.

The gasket retaining portion (51) includes a fitted portion (53) which has substantially a same inner diameter as the outer diameter of the positioning portion (42) of the gasket (34) and is fitted to the portion (42) and a positioning portion (54) which projects inward from the right end of the fitted portion (53) in the radial direction and abuts against the positioning portion (42) of the gasket (34) rightward (i.e., outside in an axial direction).

The inner diameter of the coupling member retaining portion (52) is made substantially the same as the outer diameter of the right end of a flange (11) of the first coupling member (2). At the inner circumference of the coupling member retaining portion (52) is formed an annular groove (55). An elastic ring (56) is contained inside of the annular groove (55). The elastic ring (56) is referred to as a snap ring which is obtained by forming a circular (circular cross section) metallic wire rod into a C shape, thereby providing elasticity in the radial direction.

The retainer (35) and the gasket (34) are joined via a metallic washer (57) consisting of a rigid ring. In other words, the washer (57) is a metallic ring formed in a square cross section, and has the same inner diameter as the outer diameter of the large-diameter portion (41) of the gasket (34) and the same outer diameter as the inner diameter of the coupling member retaining portion (52) of the retainer (35). The washer (57) is press-fitted to the large-diameter portion (41) of the gasket (34) and the coupling member retaining portion (52) of the retainer (35), to thus abut against the left surface of the positioning portion (42) of the gasket (34) and the left surface of the fitted portion (53) of the retainer (35).

The inner diameter of the elastic ring (56) fitted into the annular groove (55) formed at the coupling member retaining portion (52) is smaller than the outer diameter of the flange (11) of the first coupling member (2) in a free state. The coupling member retaining portion (52) is retained in the flange (11) of the first coupling member (2) by the elastic force of the elastic ring (56) which will contract in the radial direction. The diameter at the bottom surface of the annular groove (55) is greater than the outer diameter of the elastic ring (56) in the free state, and therefore, the movement of the elastic ring (56) outward in the radial direction cannot be suppressed. Thus, it is possible to readily attach or detach the retainer (35) to or from the first coupling member (2) simply by moving the retainer (35) with respect to the first coupling member (2) in the axial direction against frictional force (i.e., joining force) associated with the elastic force of the elastic ring (56). In assembling the fluid coupling, after the retainer (35) retaining the gasket (34) therein is disposed in the first coupling member (2), the subsequent work (the second coupling member (3) abuts against the gasket (34), and then, a male screw member (7) and a cap nut (8) are screwed with each other) can be performed without any fear of falling-down of the retainer (35) retaining the gasket (34) therein.

In this preferred embodiment, the retainer (35) and the gasket (34) are joined to each other via the metallic washer (57) consisting of the rigid ring. Therefore, once the retainer (35) and the gasket (34) are joined to each other, even if force in a direction in which they are to be disassembled during handling by not only frictional force but also fitting force, the gasket (34) can be securely prevented from falling from the retainer (35).

During assembling the fluid coupling, the gasket (34) is prepared in the state in which it has been previously retained in the retainer (35), and then, the retainer (35) is held in the first coupling member (2), thereby properly disposing and positioning the gasket (34). In disassembling the fluid coupling, when the retainer (35) is detached from the first coupling member (2), the gasket (34) is detached in the state in which it is retained in the retainer (35). If replacement is needed, the old gasket (34) is detached from the retainer (35), and then, it is replaced with a new one.

INDUSTRIAL APPLICABILITY

According to the present invention, the problem raised when the diameter of the retainer becomes larger can be solved in the fluid coupling in which the metallic gasket is plastically deformed to provide sealability, thus enhancing the performance of the fluid coupling having a large diameter, so that the fluid coupling can used in a wide field.

The invention claimed is:

1. A fluid coupling comprising:
   first and second coupling members having fluid passages communicating with each other;
   an annular gasket interposed between abutment ends of the coupling members;
   a retainer which retains the gasket; and
   screw means for joining the coupling members to each other, wherein
   the retainer comprises an annular gasket retaining portion for retaining the gasket and an annular coupling member retaining portion for retaining a flange of either one of the coupling members, the gasket retaining portion of the retainer is joined to the gasket via a ring, the coupling member retaining portion of the retainer is joined to the flange of the coupling member via an elastic ring, the retainer is a single piece consisting of a small-diameter portion and a large-diameter portion having a greater inner diameter than that of the small-diameter portion and being formed into an inverse L-shape in cross section, the small-diameter portion serving as the gasket retaining portion for retaining an outer peripheral surface of the gasket by an inner circumference thereof whereas the large-diameter portion serving as the coupling member retaining portion for retaining an outer peripheral surface of the coupling member by an inner circumference thereof, and the elastic ring is held in an annular groove formed at an inner circumference of the coupling member retaining portion, wherein the elastic ring is a snap ring which is obtained by forming a circular metallic wire rod into a C shape, and wherein an inner diameter of the elastic ring fitted into the annular groove of the coupling member retaining portion is smaller than an outer diameter of the coupling member in a free state, a diameter at a bottom surface of the annular groove is greater than an outer diameter of the elastic ring in the free state, the elastic ring is fixed at an outer periphery of the coupling member by an elastic force of the elastic ring which will contract in a radial direction and the elastic ring cannot fall from the annular groove, whereby the coupling member retaining portion is held in the coupling member, wherein the gasket retaining portion of the retainer is joined to the gasket via a circular metallic rigid ring formed into a rectangular shape in cross section, wherein the gasket includes: a large-diameter portion having a positioning portion projecting outward in a radial direction; and a small-diameter portion having a same inner diameter as an inner diameter of the large-diameter portion and having a smaller outer diameter than an outer diameter of the large-diameter portion, the positioning portion is formed on the boundary between the large-diameter portion and the small-diameter portion, and the gasket retaining portion includes: a fitted portion which has substantially a same inner diameter as an outer diameter of the positioning portion to be fitted to the positioning portion of the gasket; and a positioning portion which projects inward from an end of the fitted portion abutting against the positioning portion of the gasket from outside of the gasket in an axial direction, and wherein the rigid ring is press-fitted to the large-diameter portion of the gasket and the coupling member retaining portion of the retainer which does not have an annular groove, to thus abut against the positioning portion of the gasket and the fitted portion of the retainer.

2. The fluid coupling according to claim 1, wherein the rigid ring is metallic, has a same inner diameter as an outer diameter of the large-diameter portion of the gasket and a same outer diameter as an inner diameter of the coupling member retaining portion of the retainer.

* * * * *